United States Patent [19]
Zacky
[11] 4,274,688
[45] Jun. 23, 1981

[54] SLIDING DOOR STRUCTURE

[76] Inventor: Ralf G. Zacky, 4491 Deanwood Dr., Woodland Hills, Calif. 91364

[21] Appl. No.: 93,159

[22] Filed: Nov. 13, 1979

[51] Int. Cl.³ ........................ F16B 12/00; A47F 3/00; E05D 15/06

[52] U.S. Cl. ........................ 312/304; 312/140; 312/263; 49/413

[58] Field of Search ........................ 312/304, 140, 263; 49/413, 425; 52/280, 282

[56] References Cited

U.S. PATENT DOCUMENTS

| | | | |
|---|---|---|---|
| 2,877,511 | 3/1959 | Viola, Jr. | 49/413 |
| 2,889,585 | 6/1959 | Le Bon | 49/425 |
| 3,150,903 | 9/1964 | Chapman et al. | 312/140 |
| 3,324,597 | 6/1967 | Rich | 49/425 |
| 3,460,290 | 8/1969 | Wutzke | 49/425 |
| 3,859,767 | 1/1975 | Aspenwall | 52/280 |
| 3,901,571 | 8/1975 | Begitschke et al. | 312/263 |
| 3,956,854 | 5/1976 | Yamamoto | 49/425 |
| 4,098,027 | 7/1978 | Crance | 49/425 |
| 4,141,610 | 2/1979 | Ando | 312/304 |
| 4,157,852 | 6/1979 | Zacky | 312/140 |

FOREIGN PATENT DOCUMENTS

| | | | |
|---|---|---|---|
| 944618 | 4/1974 | Canada | 49/425 |

OTHER PUBLICATIONS

Engineered Product Co. Nov. 27, 1964, 2 pages publication.

*Primary Examiner*—Victor N. Sakran
*Attorney, Agent, or Firm*—Charles H. Schwartz; Ellsworth R. Roston

[57] ABSTRACT

A plurality of moldings for supporting sliding doors having a recessed bottom portion in combination with a shelf and display system of the type wherein an outer frame is formed in a particular plane of at least four tubular members each having substantially the same cross-section and each interconnected at end portions by joints and with the moldings having the following cross sections and including a groove extending along the length of each molding with the groove having a configuration to receive a portion of the outer surface of the tubular member to provide for the moldings interlocked with the tubular member, a channel extending along the length of the side moldings for receiving edge portions of the sliding doors, a pair of parallel channels extending along the length of the top molding for receiving and guiding top portions of the sliding doors, a pair of upstanding support portions extending along the length of the bottom molding for receiving and supporting the recessed bottom portions of the sliding doors, and the top, bottom and side moldings forming an inner frame within the particular plane and extending within and complementary to the tubular members forming the outer frame.

11 Claims, 3 Drawing Figures

SLIDING DOOR STRUCTURE

Figure 1:
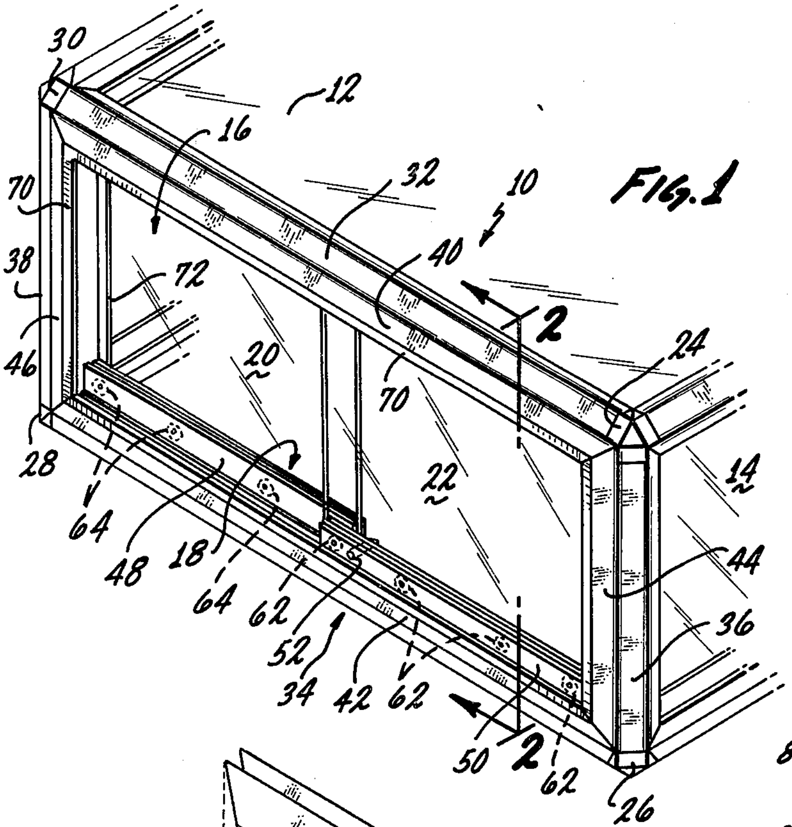

The present invention is directed to an improved sliding door structure for use with a display case. Specifically, the display case is formed by a unique molding used in association with existing shelf and display systems.

In particular, reference is made to U.S. Pat. No. 4,157,852 issued June 12, 1979, listing Ralf G. Zacky as inventor, which patent is directed to a unique structure for a display case or other panel support systems. This patent discloses the use of a molding used in association with an existing shelf and display system. As an example, the molding may be used with a system generally referred to as the "Reflected System" which system uses square tubing oriented to present an angular presentation tc the viewer of the system.

In the issued patent it is disclosed that the particular type of existing system, such as the reflected type of shelf and display system, may be used to construct a box-like structure, and with each side of the box having outer frames formed by the tubing members. Auxiliary moldings fit within the outer reflected tubing frames on each side of the reflected structure. Specifically, each molding includes a groove extending along the molding on the top of the molding and with the groove designed to accept an angular portion of each reflected tubular member. Four of such moldings are used for each side of the display case, and thereby form an inner frame located and locked within the outer frame.

In the issued Pat. No. 4,157,852, the moldings are disclosed to form inner frames for all of the sides of the display case so as to support either glass or solid panels, and a specific structure for supporting sliding panels or doors is shown so as to provide for a completely enclosed display case. The structure shown for supporting the sliding doors is satisfactory for smaller size display cases wherein the panel doors such as glass doors are not too large or heavy. However, it has been found that when the size of the display cases becomes larger, then the weight of the sliding panel doors becomes too heavy to allow for easy sliding. If the panel doors are difficult to slide, then access to the interior of the display case also becomes difficult. In addition, it was difficult to install locking mechanisms with the sliding panel doors of the issued patent since the locking mechanisms would have to be inserted through the glass panels.

The present invention is directed to a sliding door structure which uses moldings similar in construction to the moldings shown in the issued patent, yet has specific structure so as to accommodate larger and heavier sliding panel doors. Specifically, the present invention includes a bottom molding having a parallel pair of upstanding support portions extending along the length of the bottom molding. The support portions receive and support the sliding panel doors. The panel doors may be formed by glass panels mounted in sliding members having an H-shaped cross section. The sliding members receive and support the glass panels in one open end of the H and guides such as roller members may be mounted within the other open end of the H-shaped sliding members. The top and side moldings are designed to receive the top and edge portions of the sliding glass panels. Specifically, the top molding may include an elongated plastic extrusion having parallel channels to receive and guide the sliding glass panels. The side moldings may have a single channel wide enough to receive the edge portions of both glass panels, or the side moldings may include an extrusion similar to the top molding.

The moldings used in the present invention which form the inner frame to receive and support the sliding glass panels are generally larger in size than the moldings used on the remaining portions of the display case. However, even though the size of the moldings is different, the general configuration is the same, and therefore the outward appearance of the moldings of the present invention blends in with the moldings shown in the issued patent. The present invention, therefore, provides for the making of display cases which may be relatively large in size but with sliding doors which move easily and which can be locked, but with the display cases retaining the advantages of the invention shown in U.S. Pat. No. 4,157,852.

Figure 2:
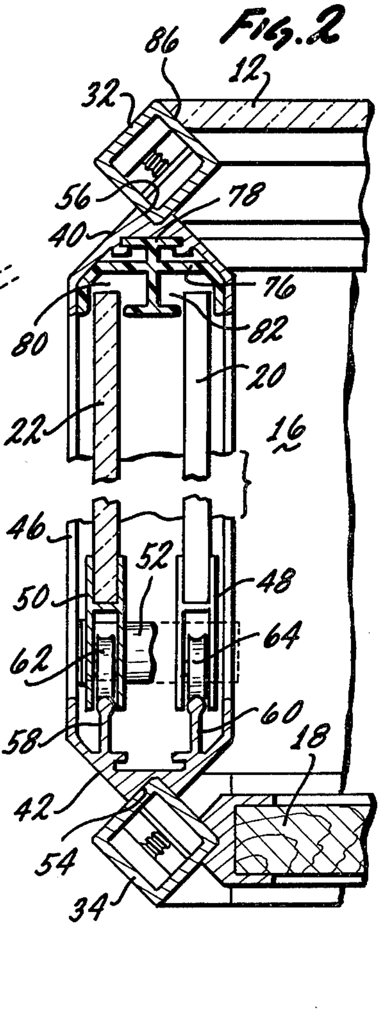
Figure 3:
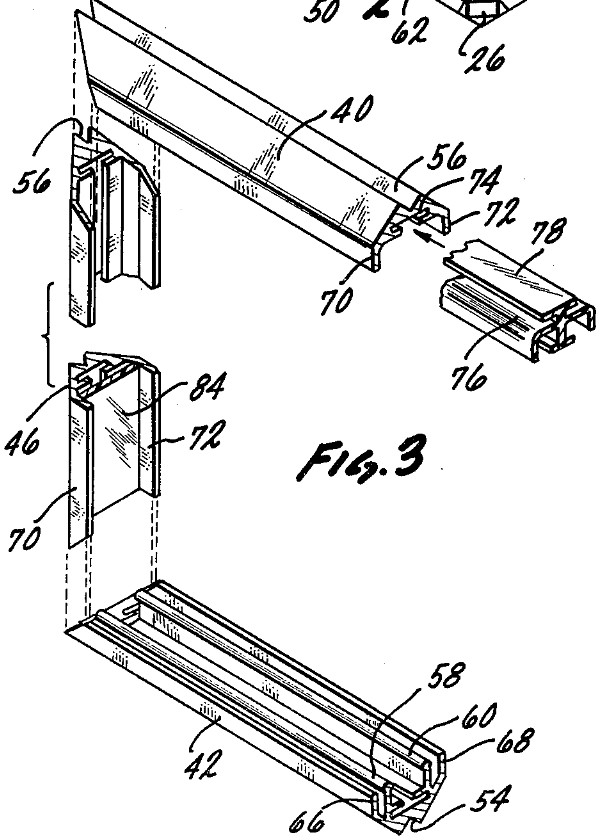

A clearer understanding of the present invention will be had with reference to the following description and drawings wherein FIG. 1 illustrates a perspective view of a portion of a display case using moldings for receiving and guiding a pair of sliding glass doors;

FIG. 2 illustrates a cross-sectional view of the portion of the display case taken along lines 2—2 of FIG. 1; and FIG. 3 illustrates in detail the different types of moldings used to provide for the sliding door structure of the present invention.

As indicated above, the present invention provides for an improved sliding door structure for use with a panel support system as shown in U.S. Pat. No. 4,157,852 issued June 12, 1979, and listing Ralph G. Zacky as the inventor. Reference is specifically made to this patent and the subject matter of this patent is incorporated herein so as to provide for a fuller disclosure of the present invention.

In FIG. 1 a display case 10 includes a top wall 12, side walls 14 and 16, a bottom wall 18, and a front wall (not shown). Some of these wall members may also be seen with reference to FIG. 2. The display case also includes a back wall formed by two sliding doors including glass panels 20 and 22.

The outer frame of the display case 10 is formed from an existing shelf and support system commonly referred to as the Reflected System. This system includes joint members 24, 26, 28 and 30 which interconnect four outer tubular members 32, 34, 36 and 38. Tubular members 32 and 34 form top and bottom outer frame members, while tubular members 38 and 40 form the side outer frame members. These tubular members together form the outer frame to receive and support the sliding door structure. Similar outer frames are formed using additional joint members and tubular members so as to support the other wall portions of the display case 10.

The sliding door structure includes four molding members 40, 42, 44 and 46. Molding members 40 and 42 form the top and bottom inner frame members, while molding members 44 and 46 form the side inner frame members. The four molding members 40, 42, 44 and 46 together form the inner frame which is received and supported within the outer frame. The glass panels 20 and 22 are each supported at their lower ends by sliding members 48 and 50. The sliding members 48 and 50 also include rollers for providing ease in the movement of the sliding doors relative to each other. One of the sliding members such as the member 50 may include an opening to receive a lock 52. The lock 52 prevents the sliding doors from moving relative to each other since the lock passes through the member 50 and blocks the path of the member 48.

Turning now to FIGS. 2 and 3, these Figures show in more detail the configuration of the molding members 40, 42, 44 and 46. Specifically, the molding members are formed as elongated extrusions and with the top and two side moldings formed from a similar extrusion and with the bottom member 42 formed from a different extrusion. The bottom molding 42 includes a V-shaped groove 54, which groove 54 receives the complementary portion of the tubular member 34. The top molding 40 and the side moldings 44 and 46 each include a similar V-shaped groove 56, and the grooves 56 receive the complementary portions of the tubular members 32, 34, 36 and 38. Therefore, the outer frame formed by the four tubular members interlocks with the moldings forming the inner frame to provide for a rigid and strong interrelationship between the inner and outer frames.

The bottom molding 42 includes upstanding support portions 50 and 60 extending along the length of the molding and the support portions include rounded ends so as to provide for a smooth sliding surface for the sliding members 48 and 50 which members support the glass panels 20 and 22. In FIG. 2 it can be seen that the sliding members 48 and 50 are formed with an H-shaped cross section and with the top open portion of the H receiving the glass panels 20 and 22. The bottom open portion of the H-shaped sliding members each receive a plurality of roller members 62 and 64. The roller members are mounted on shafts for rotation within the sliding members 48 and 50 and are positioned at periodic points along the sliding members. For example, as shown in FIG. 1, the roller members 62 are positioned at periodic points along the sliding member 50. Also, roller members 64 are positioned at periodic points along sliding member 48. The shafts which mount the rollers extend across the open end of the bottom open portion of the H. The roller members rest on the rounded upper ends of the upstanding support portions 58 and 60, and with the roller members facilitating the sliding movement of the glass panels relative to each other.

The bottom molding 42 also includes upwardly extending wall portions 66 and 68 which would help to prevent the sliding members from slipping out of place. Also, these upwardly extending wall portions provide for a cleaner outward appearance of the bottom molding since the portions 66 and 68 provide for the outer configuration of the bottom molding matching the other molding members.

The top and side moldings 40, 44 and 46 each also include outwardly extending walls 70 and 72. In addition, each of these moldings include an opening 74 which extends along the length of the molding. A plastic extrusion 76, which includes a flange portion 78, is slid into and locked in the groove 74 in the top molding 40. The plastic extrusion 76 forms a pair of parallel channels 80 and 82. The channels are formed to receive and guide the top portion of the glass members 20 and 22 during movement of the panels.

The side moldings 44 and 46 may include a similar extrusion 76 or may include a simple flat extruded member 84, as shown in FIG. 3. This extruded member 84 merely serves as a stop to cushion the impact of the glass panels as they are moved to their fully closed positions as shown in FIG. 1.

As shown in FIG. 2, the bottom wall 18 may be formed by a solid panel. The top wall 12 may be formed by a piece of glass with a tapered edge 86 so that the top surface of the glass 12 is flush with the top of the tubular members forming the top frame of the display case. The tapered edge 86 may be secured by an adhesive or a double-sided adhesive tape.

It can be seen, therefore, that the present invention provides for an improved sliding door structure for use with a panel support system formed as a display case and specifically a display case using the structure of U.S. Pat. No. 4,157,852. The improved sliding door structure includes an outer frame formed by tubular members, and an interlocked inner frame formed by molding members, and with the sliding panels, such as glass, received and supported within H-shaped elongated sliding members. The H-shaped elongated sliding members include rollers which roll on upstanding elongated support surfaces integrally formed in the bottom molding. The top portion of the sliding panels are received and guided by channels formed in an extrusion supported by the top moldings.

If it is desired to remove the doors, they may be easily removed by lifing each door upward so that the top portion of the panel further enters the channel in the extrusion thereby freeing the roller members from the upper end of the support portions. In addition, the doors may be locked to prevent movement by inserting a lock through an opening in the H-shaped sliding member.

Although the invention has been described with reference to a particular embodiment, it is to be appreciated that various adaptations and modifications may be made, and the invention is only to be limited by the appended claims.

I claim:

1. A sliding door structure for use with a display case including an outer frame located within a particular plane including at least four tubular members each having substantially the same cross-section and interconnected at end portions by joints to form the outer frame, and with the four tubular members located within the particular plane, an inner frame located within the particular plane including at least four unitary moldings extending along and complementary to the tubular members to form the inner frame, and with the inner frame located within the outer frame and within the particular plane, the unitary moldings each including a groove extending along the length of the molding and with the groove having a configuration to receive a portion of the outer surface of the tubular member and with the grooves providing for the inner frame interlocked within the outer frame, a pair of sliding doors, each formed by a sliding member and a panel member, and with the sliding member including a top portion for receiving and supporting the panel member and a bottom portion for receiving and supporting guide members, the bottom molding including a pair of upwardly extending support portions each extending along the length of the molding and parallel to each other, and with the support portions each receiving and supporting the bottom portion of the sliding member, and with the guides providing for an ease of movement of the sliding doors, and wherein the bottom molding includes additional outer upstanding wall members forming an outer configuration for the bottom molding matching the outer configuration of the top and side moldings, and the upper molding including a pair of channels extending along the length of the molding and parallel to each other for receiving and supporting the upper end of the panel members of the sliding door, and the side moldings each including a channel extending along the length of the molding for receiving side portions of the sliding doors.

2. The sliding door structure of claim 1 wherein the sliding members have an H-shaped cross section and with the panel member supported within the upper open portion of the H and the guides formed as rollers and supported within the bottom open portion of the H.

3. The sliding door structure of claim 1 wherein the parallel channels in the upper molding are formed by an elongated plastic extrusion positioned within the upper molding.

4. The sliding door structure of claim 3 wherein the extrusion includes a flange portion and the upper molding includes a complementary opening and with the flange slid into the opening to interlock the extrusion within the molding.

5. The sliding door structure of claim 1 wherein the side moldings each include an elongated extrusion located in the channel for providing a stop for the edge portions of the panel members.

6. The sliding door structure of claim 1 wherein the tubular members are square and turned angularly and the grooves in the moldings are V-shaped to receive a complementary portion of the tubular members.

7. A plurality of unitary moldings for supporting sliding doors having a recessed bottom portion in combination with a shelf and display system of the type wherein an outer frame is formed in a particular plane of at least four tubular members each having substantially the same cross-section and each interconnected at end portions by joints and with the unitary moldings having the following cross sections and including a groove extending along the length of each molding with the groove having a configuration to receive a portion of the outer surface of the tubular member to provide for the moldings interlocked with the tubular member, a channel extending along the length of the side moldings for receiving edge portions of the sliding doors, a pair of parallel channels extending along the length of the top molding for receiving and guiding top portions of the sliding doors, a pair of upstanding support portions extending along the length of the bottom molding for receiving and supporting the recessed bottom portions of the sliding doors, and wherein the bottom molding including additional outer upstanding wall members forming an outer configuration for the bottom molding matching the outer configuration of the top and side molding, and the top, bottom and side moldings forming an inner frame within the particular plane and extending within and complementary to the tubular members forming the outer frame.

8. The moldings of claim 7 for use with square tubular members which are turned angularly and with the groove in each molding V-shaped to receive a complementary portion of the tubular member.

9. The moldings of claim 7 additionally including an elongated plastic extrusion positioned within the top molding to form the parallel channels.

10. The moldings of claim 9 wherein the extrusion includes a flange and the top molding includes a complementary opening to receive and lock the flange and extrusion within the top molding.

11. The moldings of claim 7 for use with sliding doors including rollers having a concave outer surface mounted in the recessed bottom portions and with the top surface of the support portions of the bottom molding rounded to match the concave outer surface.

* * * * *